United States Patent
Kasugai et al.

(10) Patent No.: US 7,907,752 B2
(45) Date of Patent: Mar. 15, 2011

(54) FACE CENTER POSITION DETECTING DEVICE, FACE CENTER POSITION DETECTING METHOD, AND COMPUTER-READABLE MEDIUM

(75) Inventors: Junya Kasugai, Kariya (JP); Takeshi Naito, Kariya (JP); Hiroshi Ishiguro, Kariya (JP); Shigeyasu Uozumi, Toyota (JP); Kenichi Ohue, Toyota (JP)

(73) Assignees: Aisin Seiki Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 513 days.

(21) Appl. No.: 12/090,987

(22) PCT Filed: Oct. 19, 2006

(86) PCT No.: PCT/JP2006/320866
§ 371 (c)(1),
(2), (4) Date: Apr. 21, 2008

(87) PCT Pub. No.: WO2007/046477
PCT Pub. Date: Apr. 26, 2007

(65) Prior Publication Data
US 2009/0279786 A1    Nov. 12, 2009

(30) Foreign Application Priority Data
Oct. 20, 2005   (JP) ................... 2005-305189

(51) Int. Cl.
*G06K 9/00*    (2006.01)

(52) U.S. Cl. ........................ 382/103; 382/284

(58) Field of Classification Search .............. 382/103, 382/117, 118, 199, 284; 348/77, 78
See application file for complete search history.

(56) References Cited

U.S. PATENT DOCUMENTS

| | | | |
|---|---|---|---|
| 5,629,752 A | 5/1997 | Kinjo | 355/35 |
| 5,859,921 A | 1/1999 | Suzuki | 382/118 |
| 6,055,323 A | 4/2000 | Okumura | 382/118 |
| 6,707,933 B1 | 3/2004 | Mariani et al. | 382/118 |
| 2004/0151350 A1 | 8/2004 | Tafuku et al. | 382/116 |

FOREIGN PATENT DOCUMENTS
JP    4-216403 A    8/1992
(Continued)

OTHER PUBLICATIONS
European Search Report dated Sep. 14, 2009 (6 pages).

*Primary Examiner* — Andrew W Johns
(74) *Attorney, Agent, or Firm* — Sughrue Mion, PLLC

(57) ABSTRACT

It is possible to accurately detect a face center position based on an image of a person when the person is wearing glasses even when the person is facing sideways. Face images obtained as a result of photographing a face of a driver using a camera (10) are stored in an image memory (22). The CPU 24 determines positions of the sides and top and bottom positions of the face based on the face images stored in the image memory (22). Further, the CPU 24 determines whether or not the driver is wearing glasses or is facing sideways. When the wearing glasses and facing sideways is determined, a face center position is detected using face images for a lower region of the face. As a result, it is possible to detect a face center position in a reliable manner even when a driver wearing glasses is facing sideways.

9 Claims, 12 Drawing Sheets

FOREIGN PATENT DOCUMENTS

| | | |
|---|---|---|
| JP | 7-296299 A | 11/1995 |
| JP | 8-249454 A | 9/1996 |
| JP | 11-39469 A | 2/1999 |
| JP | 2004-234367 A | 8/2004 |
| JP | 2004-265431 A | 9/2004 |
| JP | 2004-310396 A | 11/2004 |
| JP | 2005-11097 A | 1/2005 |
| JP | 2006-209442 A | 8/2006 |

FIG. 3A
VERTICAL EDGE
DETECTION
OPERATORS
| 1 | 0 | -1 |
|---|---|---|
| 2 | 0 | -2 |
| 1 | 0 | -1 |
FIG. 3B
LATERAL EDGE
DETECTION
OPERATORS
| 1 | 2 | 1 |
|---|---|---|
| 0 | 0 | 0 |
| -1 | -2 | -1 |
FIG. 3C
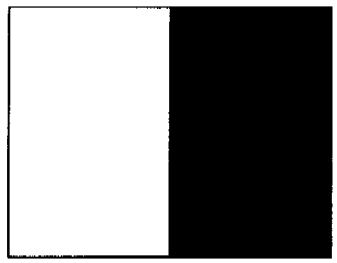
FIG. 3D
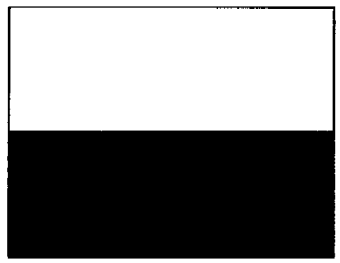
FIG. 3E
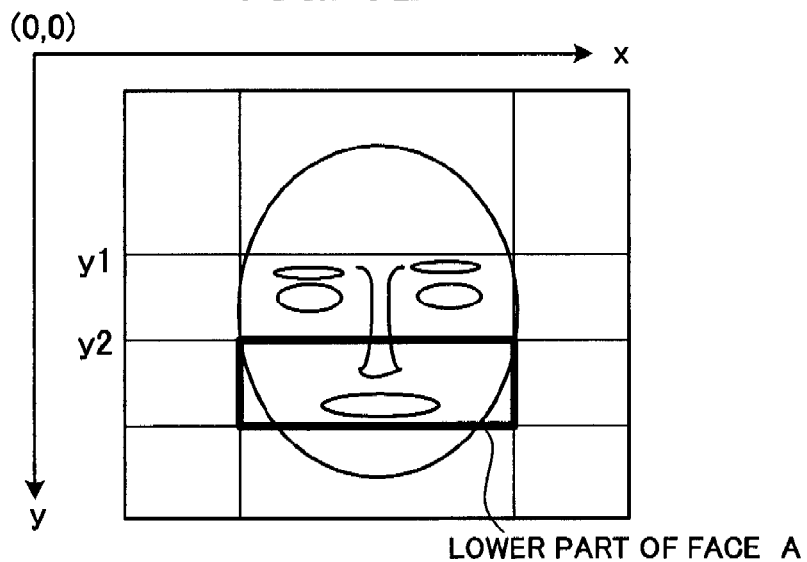
LOWER PART OF FACE A
FIG. 3F
| VERTICAL WIDTH OF A TEMPLE OF THE GLASSES | 1~3 |
|---|---|

C: FACE CENTER SEARCH REGION

C: FACE CENTER SEARCH REGION

FACE CENTER POSITION DETECTING DEVICE, FACE CENTER POSITION DETECTING METHOD, AND COMPUTER-READABLE MEDIUM

TECHNICAL FIELD

The present invention relates to a face center position detecting device, a face center position detecting method, and a computer-readable medium storing a program, capable of detecting a position of the center of a face from a face image of a person wearing glasses.

BACKGROUND ART

Detection of the position of a face and a center position and orientation of the face is important in order to recognize a person or to read facial expressions based on a face image.

For example, a method is disclosed in Unexamined Japanese Patent Application KOKAI Publication No. 2004-310396 where the position of the face is detected in a high degree of precision without being influenced by movement of the person or by the background by processing an image taken of a person's face.

Moreover, in Unexamined Japanese Patent Application KOKAI Publication No. 2005-011097 there is disclosed technology for improving precision of determination of the presence or absence of a face based on values denoting the likelihood of each possible face center lines, where the possible face center line is set by using lateral edge image detected (both sides of the face) in a read-in image obtained by photographing a region where a driver can be present.

DISCLOSURE OF INVENTION

1. Problems to be Solved by the Invention

When driving a vehicle, a driver basically drives with their face facing frontward. However, the driver may also have their face facing sideways at certain times when talking to a passenger sitting in the seat next to the driver. Further, the face and appearance of the driver may take many forms and there may be various differences such as contour lines of the face, hairstyle, and the wearing glasses etc. Erroneous detection therefore takes place when, for example, attempting to detect a center position of a face from an image taken by a camera when the face of a driver wearing glasses is facing to the side. This is because when a driver wearing glasses faces towards the side, image processing including the portion for the glasses takes place and there are therefore cases where the center position of the face cannot be accurately detected.

When an error occurs in detection of the center position of a face, it is not possible to carry out accurate processing thereafter for recognizing a person or reading facial expressions.

In order to resolve the aforementioned problems, it is the object of the present invention to provide a face center position detecting device, face center position detecting method, and program capable of detecting a center position of a face even when a driver wearing glasses is facing sideways.

2. Means for Solving the Problem

In order to achieve the above object, the face center position detecting device of the present invention is comprising a face image storage unit that stores face images obtained by photographing a face, a contour determining unit that processes face images stored in the face image storage unit and obtains positions of contours in a lateral direction of the face images, a wearing glasses determining unit that determines whether or not glasses are being worn on faces of the face images stored in the face image storage unit, a sideways orientation determining unit that determines whether or not a face of the face image stored in the face image storage unit is facing sideways, and a center position detecting unit that detects a center position of a face based on images for a lower part of a face of the face images stored in the face image storage unit and for regions between contour positions obtained by the contour determining unit when the wearing glasses determining unit determines that glasses are being worn on the face of the face image and the sideways orientation determining unit determines that the face of the face image is facing sideways.

Preferably, the wearing glasses determining unit determines whether or not an image of a temple of the glasses is included in the face image, and determines that glasses are being worn on the face of the face image when it is determined that an image of a temple of the glasses is included in the face image.

Further, at the face center position detecting device, the sideways orientation determining unit may include means for determining whether or not an image of a temple of the glasses is contained in the face image, and means for determining that the face is facing sideways when determined by the means that an image of a temple of the glasses is contained in the face image.

Moreover, at the face center position detecting device, the center position detecting unit may detect a center position in a lateral direction of the face based on an image of a region for a part of the face image below the glasses that is an image of a region positioned between positions of contours in the lateral direction.

Further, at the face center position detecting device, the center position detecting unit may include a vertical direction center position detecting means that detects a vertical center position of a face, and the vertical direction center position detecting means comprises eye region image storing means that store standard eye region images, synthesizing means that synthesize images of eye regions stored in the eye region image storing means at the eye regions of the face images, and means for detecting a center position of a face in a vertical direction based on images synthesized by the synthesizing means.

The center position detecting unit may also detect a provisional face center position based on a region for a lower part of a face, of the face images stored in the face image storage unit, and an image for a region between positions of contours obtained by the contour determining unit, set face center searching regions based on the provisional face center position, and detect the center position of the face again from within the face center search region.

Further, the center position detecting unit may also set the face center search region centered on the provisional face center position in such a manner that a left edge position coordinate and a right edge position coordinate are bilaterally symmetrical.

Moreover, the face center position detecting method of the invention is comprising a face image storing step of storing face images obtained by photographing a face, a contour determining step of processing face images stored in the face image storing step and obtaining contour positions in a lateral direction of the face, a wearing glasses determining step of determining whether or not glasses are worn on the faces of the face images stored in the face image storing step, a sideways orientation determining step of determining whether or not a face of a face image stored in the face image storing step is facing sideways, and a center position detecting step of detecting a center position of a face based on images for a lower part of a face of the face images stored in the face image storage unit and for regions between contour positions obtained at the contour determining unit when determined in the wearing glasses determining step that glasses are being worn on the face of the face image and the sideways orientation determining step determines that the face of the face image is facing sideways.

Further, a program for controlling a computer used as a face center detecting apparatus for detecting a face center in a face image executes a face image storing step that stores face images obtained by photographing a face, a contour determining step that processes face images stored in the face image storage step and obtains positions of contours in a lateral direction of the face images, a wearing glasses determining step that determines whether or not glasses are being worn on faces of the face images stored in the face image storage unit, a sideways orientation determining step that determines whether or not a face of the face image stored in the face image storage unit is facing sideways, and a center position detecting step of detecting a center position of a face based on images for a lower part of a face of the face images stored in the face image storage unit and for regions between contour positions obtained by the contour determining unit when determined in the wearing glasses determining step that glasses are being worn on the face of the face image and the sideways orientation determining step determines that the face of the face image is facing sideways, on a computer.

According to the present invention, it is possible to accurately detect a center position of a face even when the face of a driver wearing glasses is facing sideways.

BRIEF DESCRIPTION OF DRAWINGS

[FIG. 3A] A diagram showing an example of a vertical edge detection operator.

[FIG. 3B] A diagram showing an example of a lateral edge detection operator.

[FIG. 3C] A diagram showing an example of consecutive shading differences in a vertical direction.

[FIG. 3D] A diagram showing an example of consecutive shading differences in a sideways direction.

[FIG. 3E] A diagram showing an example of data specifying a region of a face image.

[FIG. 3F] A diagram showing an example of data for detecting a temple of glasses.

Figure 1:
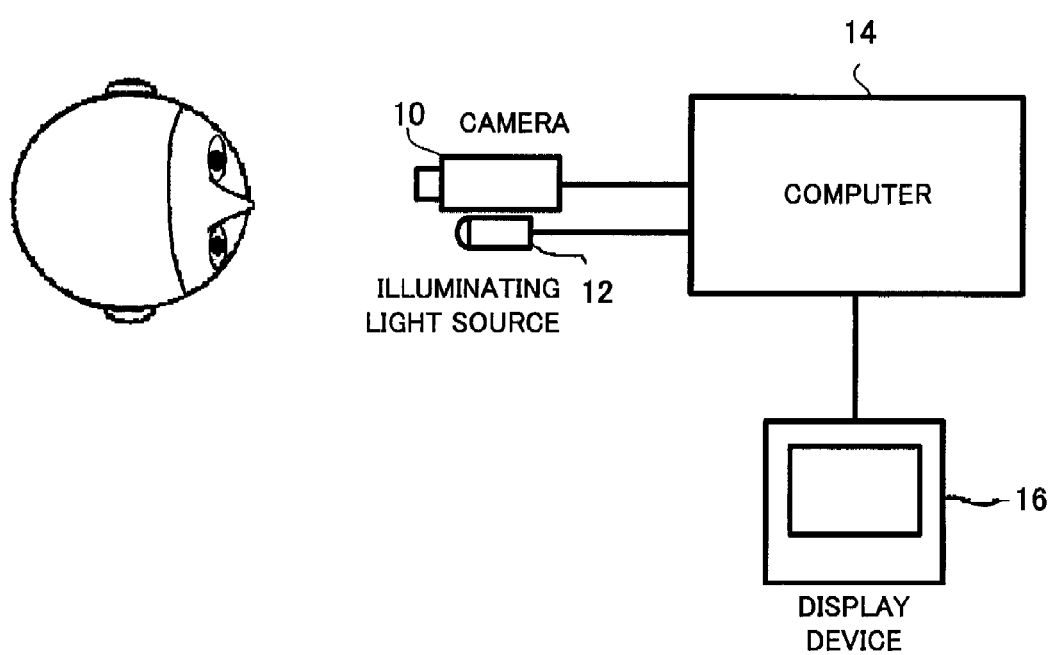
[FIG. 1] A block diagram of a face center position detecting device of an embodiment of the present invention.

EXPLANATION OF REFERENCE NUMERALS 10 camera
22 image memory (face image storing means)
23 ROM (contour determining means, wearing glasses determining means, facing sideways determining means, center position detecting means)
24 CPU (contour determining means, wearing glasses determining means, facing sideways determining means, center position detecting means)

BEST MODE FOR CARRYING OUT THE INVENTION

The following is a description of a face center position detecting device of an embodiment of the present invention.

As shown in FIG. 1, a face center position detection device of this embodiment is equipped with a camera 10 that takes pictures of the face of a driver and generates face images, an illuminating light source 12 that illuminates the face of the driver, a computer 14 that detects a center position of the face of the driver, and a display device 16 that is connected to the computer 14.

The camera 10 is constructed from, for example, a CCD camera etc., and acquires a grayscale image for the face of a driver. A face image generated by the camera 10 includes not only the face of the driver but also a background, etc.

The display device 16 is constructed from an LCD (Liquid Crystal Display) or CRT (Cathode Ray Tube) etc., and displays binarized images etc. generated from face images taken by the camera 10.

Figure 2:
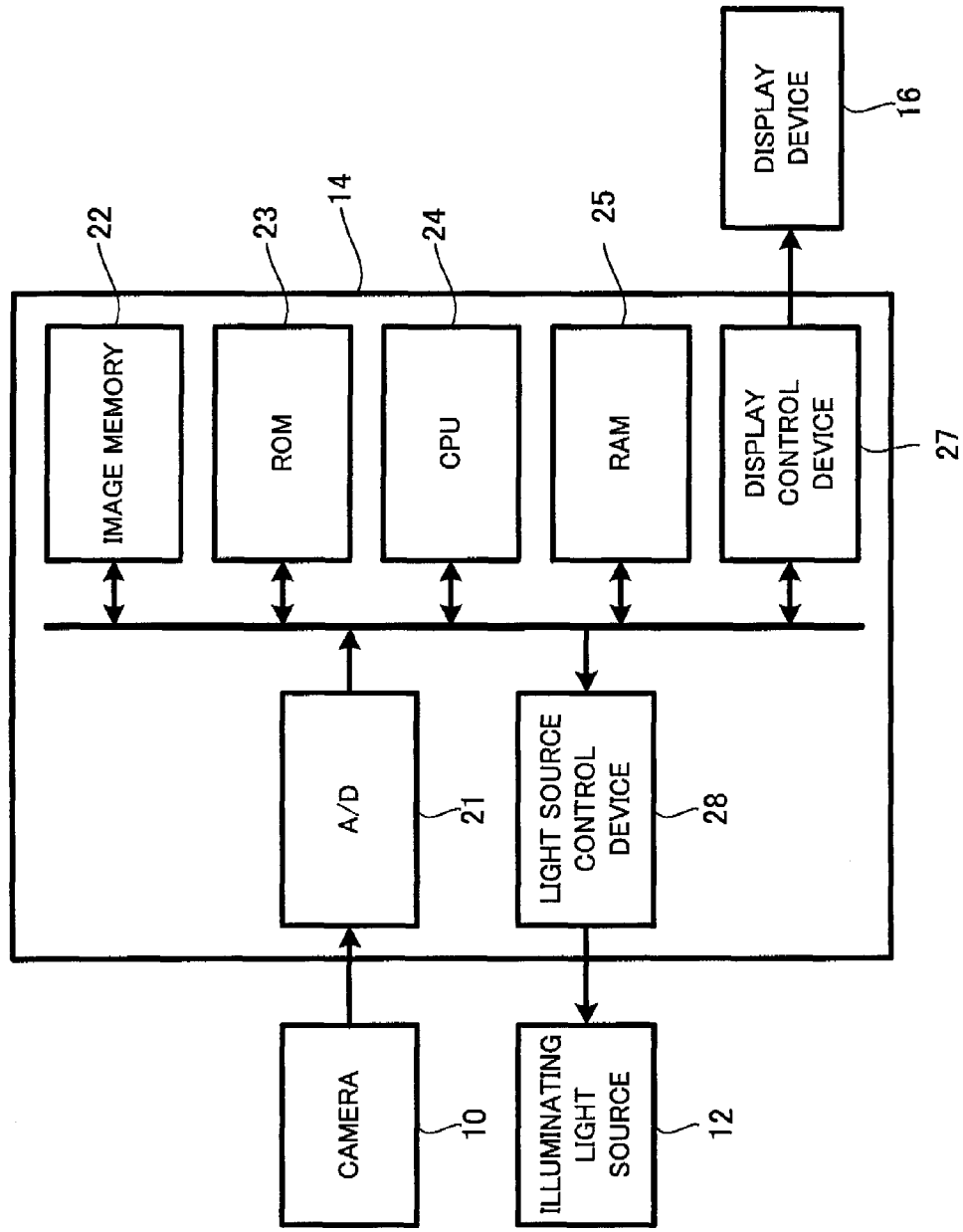
[FIG. 2] A block diagram showing a configuration for a computer shown in FIG. 1.

The computer 14 processes a face image acquired by the camera 10, detects the left and right edge positions and top and bottom positions of the face, obtains a provisional face center position occurring at the lower face region based on the detected left and right edge positions and top and bottom positions, and then obtains a center position for the face. As shown in FIG. 2, the computer 14 is equipped with an A/D converter 21, an image memory 22, a ROM 23, a CPU 24, a RAM 25, a display control device 27, and a light source control device 28.

The A/D (analog to digital) converter 21 converts an analog image signal taken by the camera 10 into a digital signal.

The image memory 22 stores image data generated by the camera 10 and put into digital form by the A/D converter 21.

The ROM 23 stores a program for controlling operation of the CPU 24. Further, the ROM 23 stores various fixed data in order to execute image processing described in the following.

The CPU 24 subjects face images obtained by the camera 10 to processing by executing programs stored in the ROM 23 so as to obtain positions for both edges of the face positions and for the top and bottom positions of the face. A provisional center position for the face at the lower region of the face is then obtained based on the detected edge positions and top and bottom positions and the center position of the face is then obtained.

The RAM 25 functions as a work area for the CPU 24.

The display control device 27 controls the display device 16 under the control of the CPU 24.

The light source control device 28 controls lighting and extinguishing of the illuminating light source 12.

An example of fixed data stored in the ROM 23 is described below with reference to FIG. 3A to FIG. 3F. To begin with, as shown in FIG. 3A and FIG. 3B, the ROM 23 stores operators for a Sobel filter for vertical edge detection use and lateral edge detection use. In the present invention, the boundary lines continuing in a vertical direction of the image are vertical edges, and the boundary lines continuing in a horizontal direction are lateral edges. As shown in FIG. 3A and FIG. 3B, a Sobel filter for vertical edge detection use and a Sobel filter for lateral edge detection use are operators for extracting a boundary (edge) of a shading difference continuing in a vertical direction as shown in FIG. 3C and FIG. 3D and a shading difference continuing in a sideways direction.

Further, as shown in FIG. 3E, of the face images stored in the RAM 25, data specifying a region where images for eyes and eyebrows are assumed to exist, and data specifying a lower part of a face A that is a region lower than a region (or region where images for glasses exist) where images for eyes and eyebrows are assumed to exist is stored in the ROM 23.

Further, the ROM 23 stores the vertical size of the temple of the glasses in order to detect a temple of the glasses, as shown in FIG. 3F.

The following is a description of the operation of a face center position detecting device having the above structure.

Figure 4:
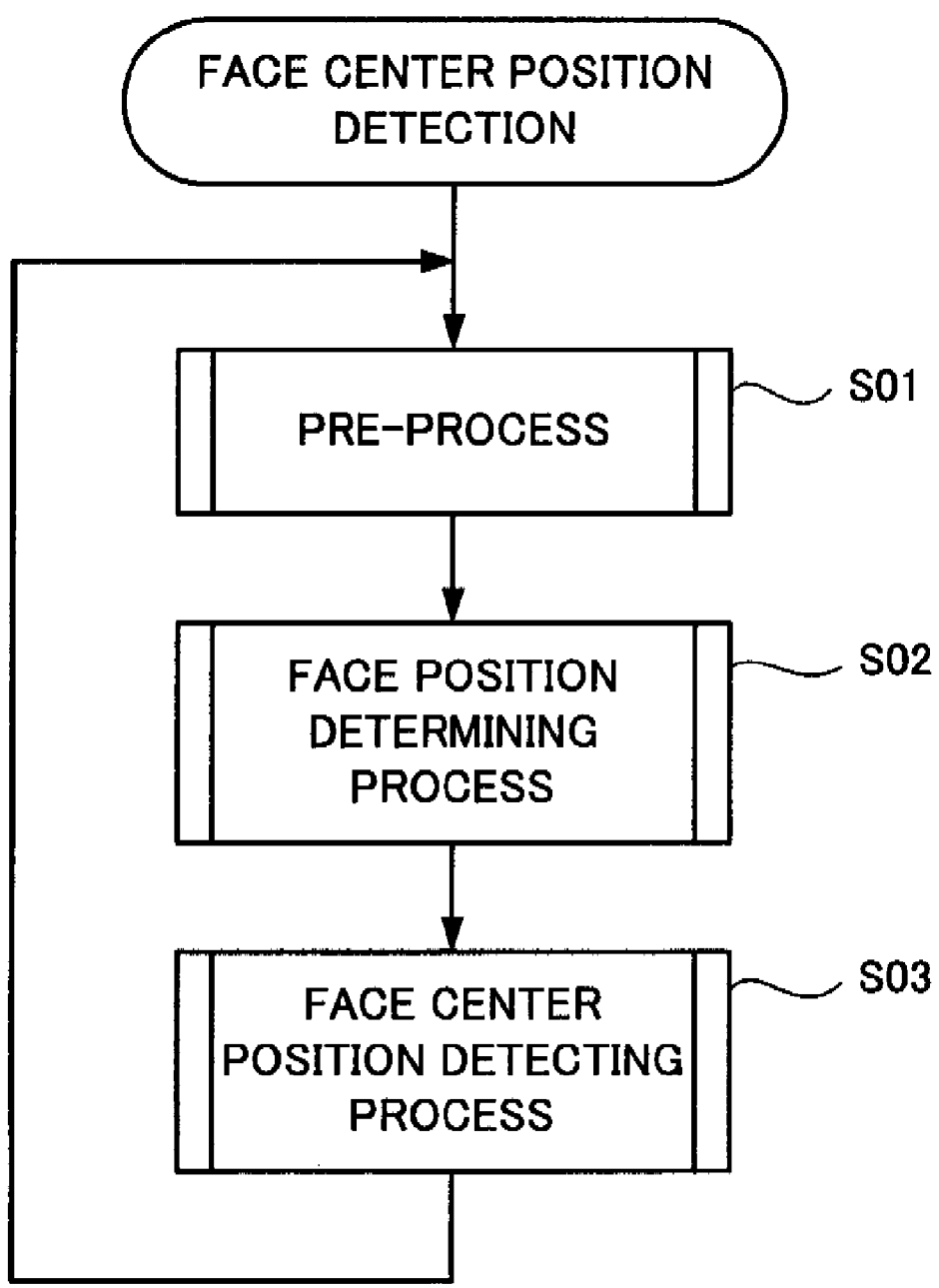
[FIG. 4] A flowchart illustrating the operation of the face center position detecting device shown in FIG. 1.

When a power supply is turned on, the CPU 24 within the computer 14 repeatedly executes the process shown in FIG. 4.

Namely, the CPU 24 repeatedly executes process constituted by pre-process (step S01), face position determining (detecting) process (step S02), and face center position detecting process (step S03).

The pre-process (step S01) and the face position determining process (step S02) constituting the processing shown in FIG. 4 are processing for obtaining a position (coordinates) of a face of a driver in a vertical direction and a sideways direction.

The face center position detecting process (step S03) is processing that detects the center position of the face of a driver.

Figure 5:
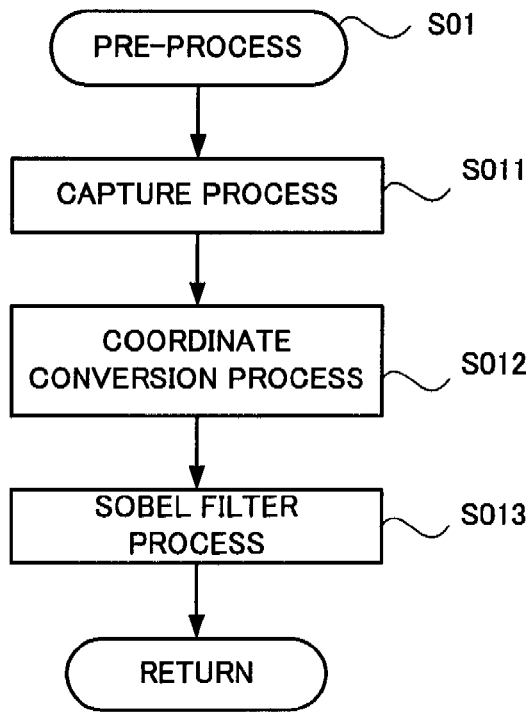
[FIG. 5] A flowchart illustrating a specific example of the pre-process of FIG. 4.

As shown in FIG. 5, the pre-process (step S01) is comprised of capture process (step S011), coordinate conversion process (step S012), and Sobel filter process (step S013).

The capture process (step S011) is processing for taking in a face image of the driver for one frame portion taken by the camera 10 via the A/D converter 21 for storing in the image memory 22.

The coordinate conversion process (step S012) is processing for thinning out pixels to an extent to where processing is possible.

The Sobel filter process (step S013) is processing that processes face images after coordinate conversion using a vertical edge detection Sobel filter (FIG. 3A) stored in the ROM 23, performs processing to accentuate the vertical edge within the face image, processes a face image after coordinate conversion using a lateral edge detection Sobel filter (FIG. 3B), and carries out processing to accentuate the lateral edges within the face image.

Figure 6:
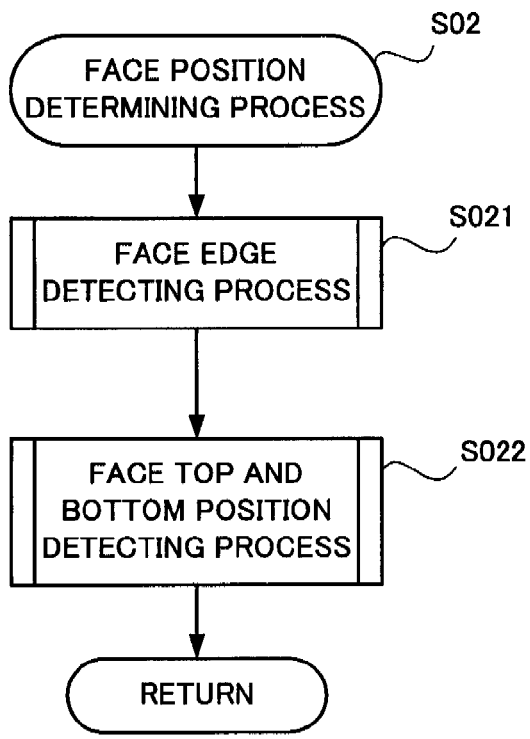
[FIG. 6] A flowchart illustrating a specific example of the face position determining process of FIG. 4.

The face position determining process of FIG. 4 (step S02) is processing for detecting left and right edge positions and top and bottom positions of a face using the pre-processed face image, and as shown in FIG. 6, is comprised of face edge detecting process (step S021) and face upper and lower position detecting process (step S022).

The face edge detecting process (step S021) is processing for face images operated on by an operator for vertical edge detection that is processing specifying lines making up both edges of a face that may adopt existing arbitrary techniques.

Figure 7:
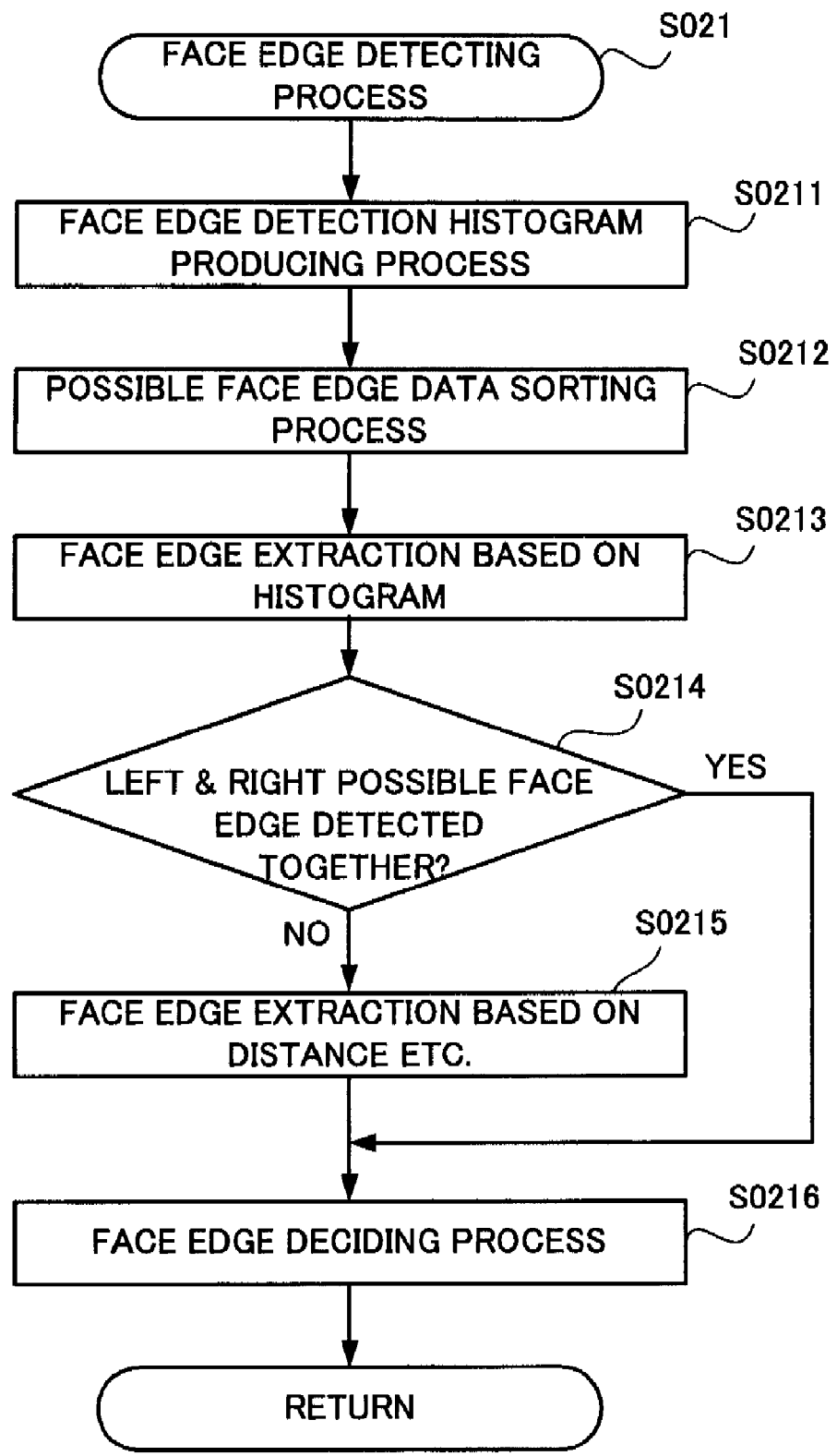
[FIG. 7] A flowchart illustrating a specific example of processing for detecting both ends of the face of FIG. 6.

For example, as shown in FIG. 7, processing for making a histogram for face edge detection is carried out (step S0211). A predetermined number with high histogram peak values are then extracted, sorted (step S0212), and edge point extraction is carried out based on the histogram values (step S0213). For example, in the case where the value of a histogram value of upper order 1 or 2 is extremely large compared with others, this value is taken as an end point.

After that, it is determined whether or not two (both) edge points have been extracted (step S0214). If two have been extracted (step S0214; YES), processing is carried out deciding the two extracted points as both edges (x-coordinates) of the face (step S0216). On the other hand, if two edge points are not extracted (step S0214; NO), end points are decided by extracting a combination where the distance of the two points have a gap that is convincing as the width of a person's face (step S0215). Finally, processing is carried out to decide the ends (x-coordinates) of the face surface (step S0216).

Further, as disclosed in Unexamined Japanese Patent Application KOKAI Publication No. 2004-310396, a time differential for the photographed image is calculated, pixel values for the pixel value time differential image are projected in a vertical direction, and a histogram is made. A histogram for images extracted for the edges and a histogram for pixel value time differential images are then totaled. Values of the histogram where peak values are high may then be extracted, points that are convincing as the width of a person's face may be decided upon, and positions of the ends of the face may be detected.

Figure 8:
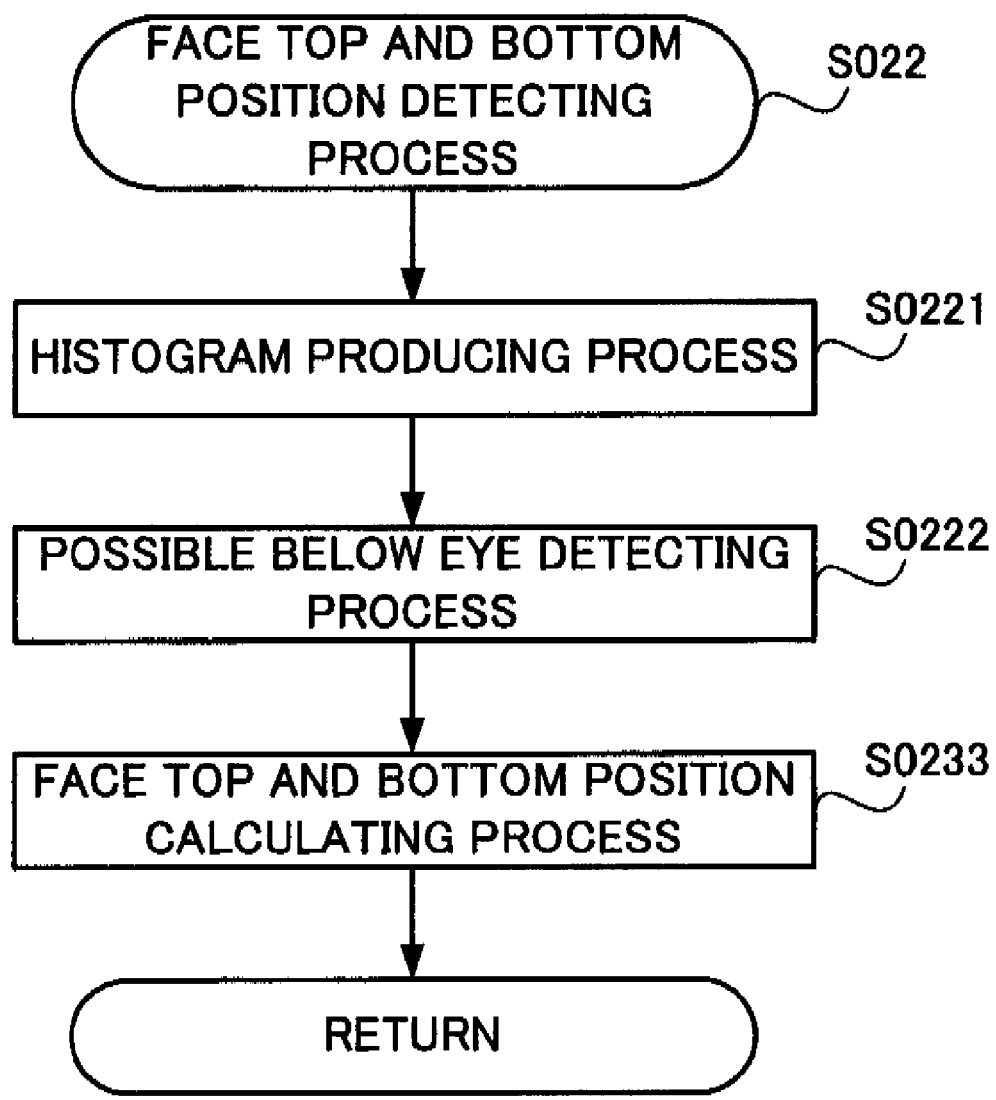
[FIG. 8] A flowchart illustrating a specific example of the processing for detecting the top and bottom positions of a face of FIG. 6.

Equally, the face top and bottom position detecting process of step S022 of FIG. 6 is processing that is the same as the above processing carried out on the lateral edges that detects substantial positions (upper ends) of eyebrows of the face and the position of the mouth (lower end), and, for example, as shown in FIG. 8, is constituted by histogram producing process (step S0221), the possible below eye detecting process (step S0222), and the face top and bottom position calculating process (step S0233).

The histogram producing process (step S0221) is processing that projects values for pixels after Sobel filter process using a lateral edge detection Sobel filter in a sideways direction and produces a histogram.

The possible below eye detecting process (step S0222) is processing that selects possible for histogram values corresponding to the eyes, eyebrows, and mouth etc. based on the histogram values.

The face top and bottom position calculating process (step S0223) is processing that detects the positions of upper and lower ends of a face (y-coordinates) (for example, the position of the eyes/eyebrows) from selected possibles. The upper end position of the face (y-coordinate) is, for example, set as a position a three-pixel portion up from a detected eyebrow and a position (between a mouth and a jaw) a portion three pixels below the detected mouth.

The CPU 24 stores the positions (x-coordinates) for the face edges (left and right edges) and the top and bottom positions (y-coordinates) of the face obtained in steps S021 and S022 in this manner in the RAM 25.

Figure 9:
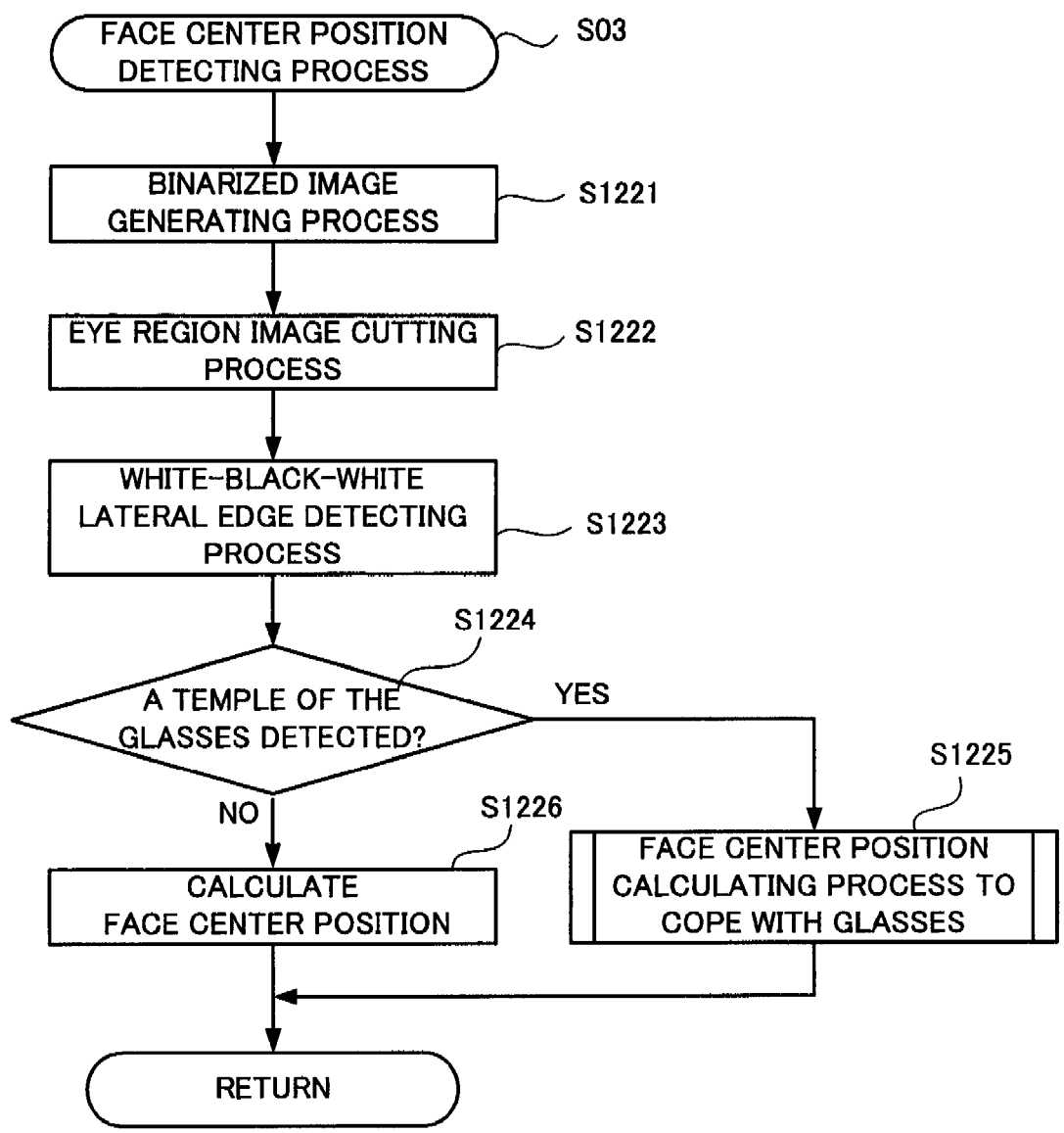
[FIG. 9] A flowchart illustrating a specific example of processing for detecting a center position of a face of FIG. 4.

Next, the face center position detecting process of FIG. 4 (step S03) has the structure shown, for example, in FIG. 9.

Figure 10A:
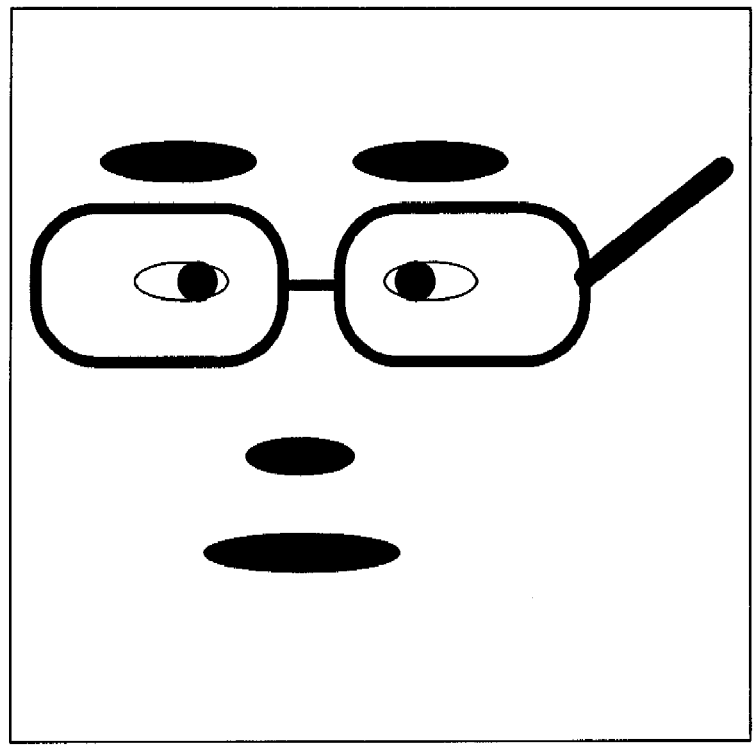
[FIG. 10A] A diagram schematically showing an example of a binarized face image.

First, the CPU 24 binarizes the grayscale of each pixel constituting a face image stored in the RAM 25 based on an arbitrary threshold value (step S1221). For example, an average value for all of the pixels forming the face image can be used as a threshold value. As a result, it is, for example, possible to form a binarized face image of a driver as shown schematically in the example in FIG. 10A.

The CPU 24 then executes process on the binarized image to cut-out an eye region image (step S1222).

Figure 10B:
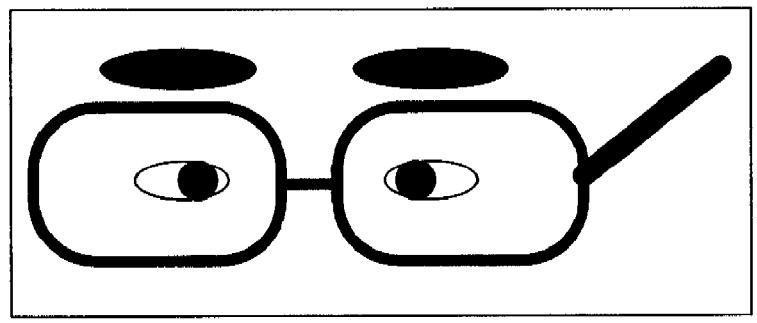
[FIG. 10B] A diagram schematically showing an eye region of a binarized image.

In this eye region image cutting out process, first, the CPU 24 reads region specifying data defining regions where it is predicted that eyes exist (y1, y2 shown in FIG. 3E), of the face image, from the ROM 23. An eye region for the binarized image corresponding to the region specifying data is then cut out as shown in FIG. 10B.

White-black-white lateral edges are then detected for the cut-out eye region image.

Here, rather than referring to an edge that is simply a boundary of white and black, a white-black-white edge refers to an edge having a predetermined width that changes from white to black, and furthermore from black to white. Of these, the white-black-white lateral edge refers to a boundary extending in a sideways direction.

The CPU 24 starts white-black-white lateral edge detecting process (step S1223) and detects a row of black pixels of a width of 1 to 3 pixels (2 to 4 pixels for a normal eye) in a vertical direction in accordance with the size of temple of the glasses, from within the eye region image in accordance with the settings shown in FIG. 3F.

The technique itself for detecting white-black-white lateral edges is arbitrary. For example, a method can be adopted where the y coordinate value is sequentially updated, brightness of the pixels (x, y) is determined, and when the brightness changes from white to black, the number of consecutive black pixels is counted. It is then determined whether the number of consecutive black pixels at the time of changing from black to white is 1 to 3. If the consecutive number is 1 to 3, the pixels are maintained. If this is not the case, the pixels are changed to white.

After that, the CPU 24 carries out processing to determine the presence of a temple of the glasses (step S1224). When a black region of 1 to 3 pixels in the vertical direction is obtained for an image of an eye region after processing, the CPU 24 determines that a temple of the glasses is detected.

When a temple of the glasses is not detected in step S1244 (step S1224; NO), a center position of the face (center of gravity position) is obtained using the face image (step S1226). The technique for measuring the center itself is arbitrary but, for example, it is possible to obtain the coordinates of a center (center of gravity) position of the face from the following equation.

x coordinate of center of face=$\Sigma xi/n$, xi: value of x coordinate for black pixel No. i y coordinate of center of face=$\Sigma yi/n$, yi: value of y coordinate for black pixel No. i i:1 to n, where n is the total of black pixels It is also possible to obtain the center position only from an image of the essential parts (eyebrow, eye, nose, mouth) of the face.

On the other hand, when it is determined that a temple of the glasses is present (step S1224; YES), the driver wearing the glasses is facing sideways. An image is therefore processed prior to obtaining a face center position, and a face center position can then be obtained in an accurate manner (step S1225). This is to avoid the average value of each pixel constituting the lateral edge used to obtain the center position of the face being influenced when processing takes place with a face image containing a temple of the glasses being left as is.

Figure 11:
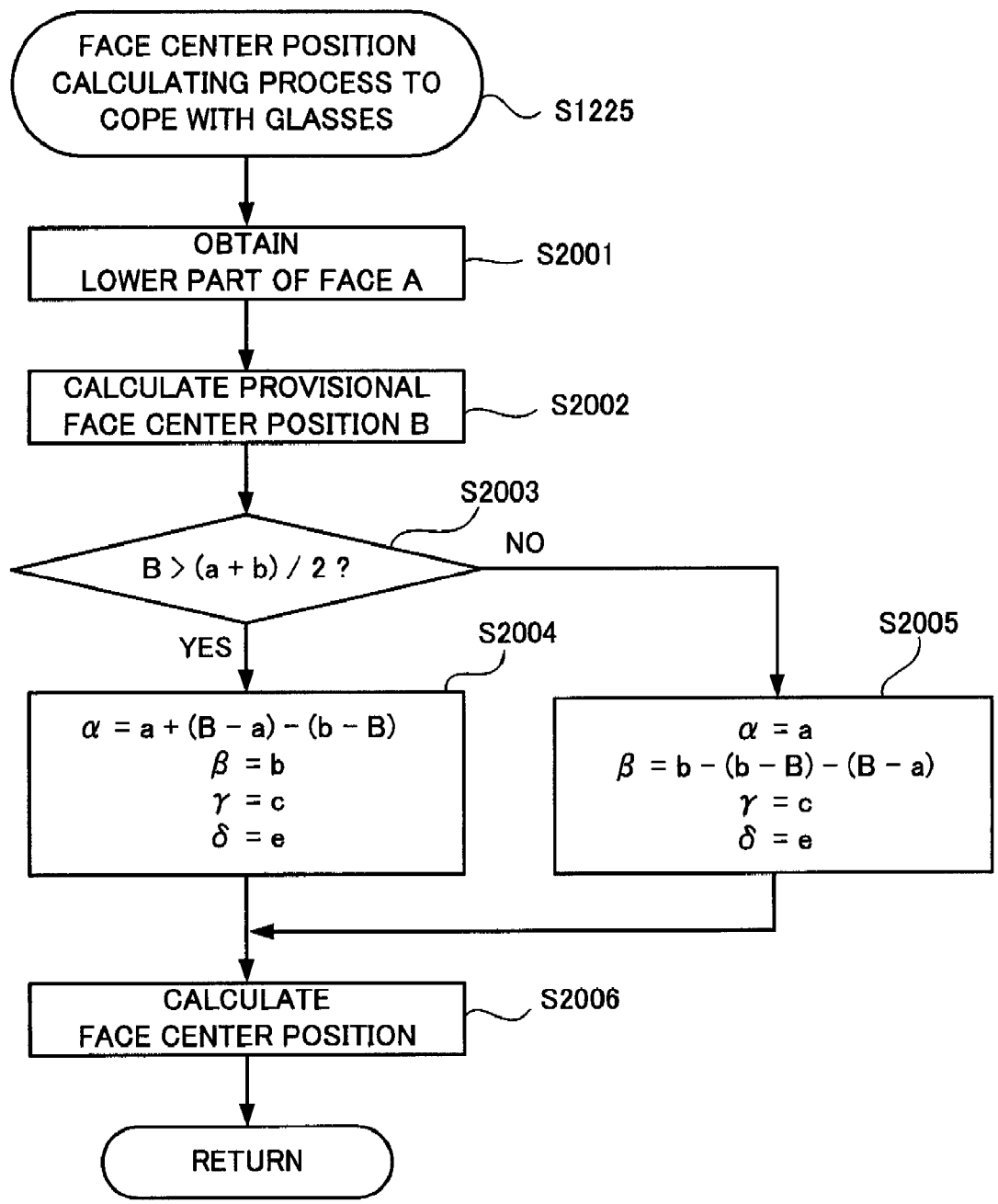
[FIG. 11] A flowchart illustrating a specific example of face center position calculating process as a measure for glasses of FIG. 9.

Face center position calculating process to cope with glasses (step S1225) has, for example, the structure shown in FIG. 11.

Figure 10C:
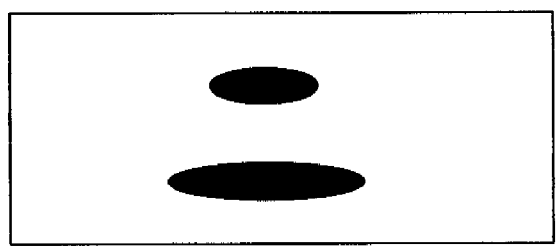
[FIG. 10C] A diagram schematically showing an example of a cut-out lower region of a face.
Figure 12:
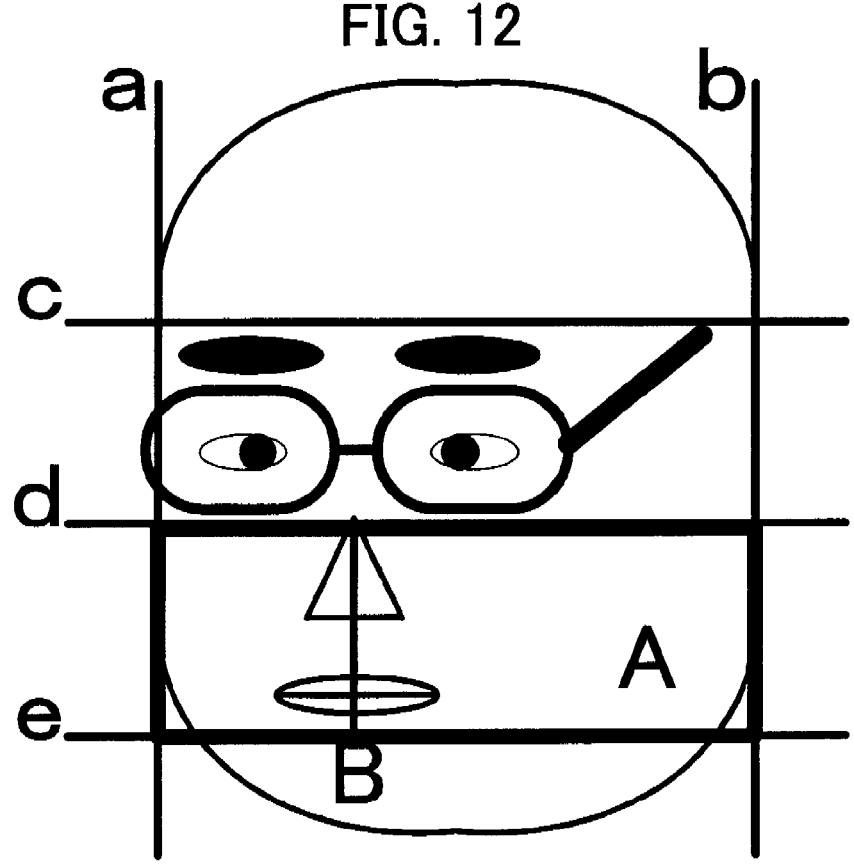
[FIG. 12] A diagram illustrating processing for obtaining a lower part of a face A of a face image when the face is facing to the right.

First, the CPU 24 obtains the lower part of a face A shown in FIG. 3E (step S2001). Specifically, the method for obtaining the lower part of a face A is arbitrary but, for example, face lateral edge positions (x coordinates) calculated in initial processing and the positions of the top and bottom of a face (y coordinates) are utilized. As shown in the drawing of a face of a driver of FIG. 12, the face edge positions (x coordinates) correspond to coordinates a, b of the edge positions of the face, and the top and bottom positions of the face (y coordinates) correspond to the coordinates c, e of the top and bottom positions of the face, as shown in FIG. 12. The CPU 24 then first obtains a center coordinate d for the coordinate c and the coordinate e in order to calculate the lower part of a face A. A region including a range between obtained coordinates d and e and a range between coordinates a and b is taken as the lower part of a face A, and is cut out as shown in FIG. 10C.

Returning to the flowchart of FIG. 11, the CPU 24 calculates a provisional face center position B for the x-axis using a binarized image for the cut-out lower part of a face A (step S2002). The technique for measuring the center itself is arbitrary but, for example, it is possible to obtain coordinates for a center (center of gravity) position in an x-axis direction of the face from the following equation.

x coordinate of center of face=$\Sigma xi/n$, xi: value of x coordinate for black pixel No. i i:1 to n, where n is the total of black pixels within the lower part of a face A The CPU 24 then obtains a face center search region C for obtaining a final, accurate face center position. It is therefore possible to obtain a face center position more accurately by obtaining a center position for the face within the face center search region C.

Figure 13:
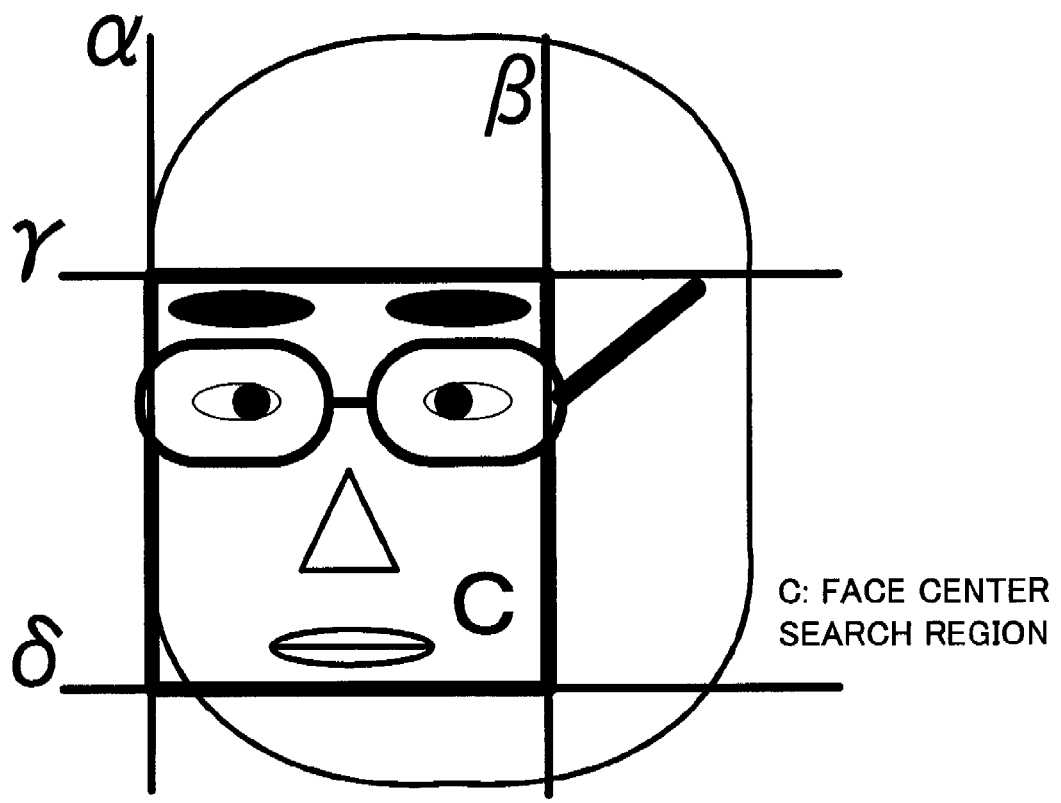
[FIG. 13] A diagram illustrating processing for obtaining a face center search region C occurring at a face image when the face is facing to the right.

The CPU 24 therefore first determines whether the face of the driver is facing in a right direction or facing in a left direction (step S2003). As a method of determining whether the face of the driver is facing in a right direction or facing in a left direction, for example, it is determined whether or not the provisional facial center position B of the x-axis is larger than the center (a+b)/2 of the positions of the left and right edges. Here, when it is determined that B>(a+b)/2 is not the case (step S2003; NO), the face is facing to the right. The coordinate α for the left edge position of the face, a coordinate β for the right edge position of the face, a coordinate γ for the upper edge position of the face, and a coordinate δ for a lower edge position of the face are obtained in line with this (step S2005). Specifically, it is taken that α=a, β=b−(b−B)−(B−a), γ=c, δ=e, the face center search region C constitutes a region surrounded by a thick frame of FIG. 13.

Figure 14:
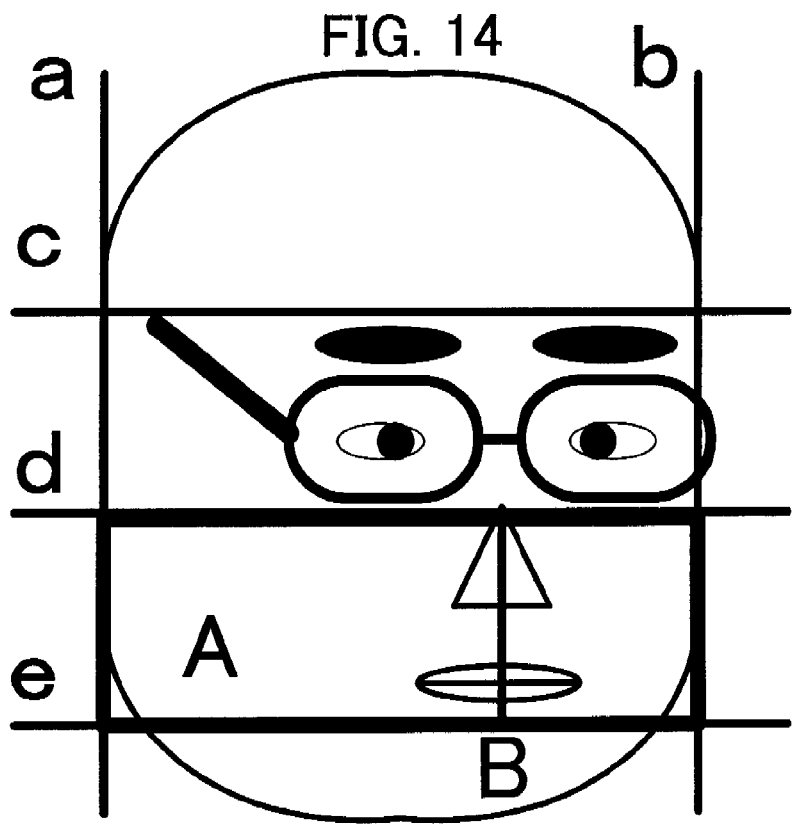
[FIG. 14] A diagram illustrating processing for obtaining a lower part of a face A of a face image when the face is facing to the left.
Figure 15:
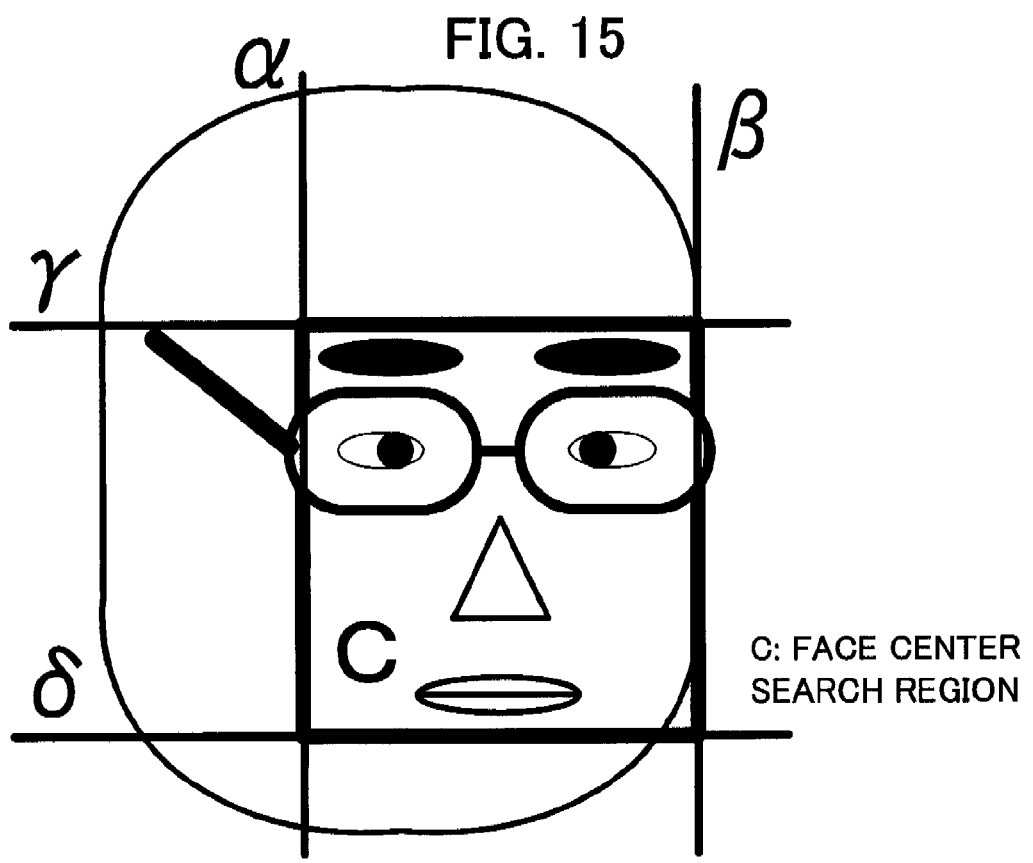
[FIG. 15] A diagram illustrating processing for obtaining the face center search region C of a face image when the face is facing to the left.

On the other hand, when it is determined that B>(a+b)/2 (step S2003; YES), as shown in FIG. 14, the face is facing towards the left. The coordinate α for the left edge position of the face, the coordinate β for the right edge position of the face, the coordinate γ for the upper edge position of the face, and the coordinate δ for a lower edge position of the face are then obtained in line with this (step S2004). Specifically, it is taken that α=a+(B−a)−(b−B), β=b, γ=c, δ=e, the face center search region C constitutes a region surrounded by a thick frame of FIG. 15.

As a result of the process of steps S2003 to S2005 above, a face center search region C is obtained so that the left edge position coordinate α and the right edge position coordinate β are symmetrical to the left and right centered on the provisional face center position B obtained in step S2002.

After obtaining the face center search region C, the CPU 24 obtains a center position (center of gravity position) of the face in a vertical direction within the obtained face center search region C (step S2006). The technique for measuring the center itself is arbitrary but, for example, it is possible to obtain coordinates for the position of the center (center of gravity) of a face from the following equation.

x coordinate of center of face=Σxi/n, xi: value of x coordinate for black pixel No. i y coordinate of center of face=Σyi/n, yi: value of y coordinate for black pixel No. i i:1 to n, where n is the total number of black pixels within the face center search region C The center position of the face is obtained in the above, the face center position calculating process to cope with glasses (step S1225) of FIG. 11 is complete, and the face center position detecting process (step S03) of FIG. 9 is complete. Namely, as a result of this processing, a center position of the face is obtained, and the process of FIG. 4 is complete.

Thereafter, the CPU 24 repeatedly executes the process of FIG. 4, and the center position of the face of the driver continues to be obtained. Further, the obtained center positions for the face are stored in the RAM 25 and can be utilized in the desired processing thereafter.

As a result of the above processing, the face center position detection device of this embodiment can accurately detect the center position of the face even when the face of a driver wearing glasses faces sideways.

The present invention is not limited to the above embodiment, and various modifications and applications are possible.

For example, in the above embodiment, the eye region is fixed to a specific region of the image but it is also possible for the position of the eye region to be appropriately set according to the size and position of the image of the face. In this case, for example, it is also possible for a lateral edge Sobel filter to be applied, for the position of the eyes and eyebrows of the face to be determined, and for an area of a predetermined size including this area to be adopted as the eye region.

Further, in the above embodiment, the position of the center (center of balance) of the face is obtained from the grayscale image of the eyes and eyebrows (or eyes), nose, and mouth but the portions (parts) of the face used in determining the center position are arbitrary. For example, it is also possible to obtain the center by adding the ears, cheeks, and hair, etc.

The above embodiment, detection of the presence or absence of a temple of the glasses is shown for the invention in order to detect the center position of the face but this is by no means limiting, and the temple of the sunglasses or the presence or absence of other accessories etc. may also be detected.

Further, in the above embodiment, the center position of the face in a vertical direction is obtained from the average value of each pixel constituting the vertical edges regardless of the presence or absence of glasses in the image. However, when glasses are present in the image, it is possible to obtain a more accurate center position for the face in a vertical direction after correcting the image.

Specifically, for example, the CPU 24 determines that glasses are detected when two black regions of 1 to 3 pixels are obtained in the vertical direction for the image of the eye region.

When glasses are determined to be present, a standard image for an eye region prepared in advance that is stored in the image memory 22 or the ROM 23 is synthesized with an image where the eye region has been deleted from the original binary image and a face image for center position measuring use is generated. It is also possible to determine the position of the glasses and adjust the eye position to be synthesized.

Continuing on, a center position for a face (face position, center of balance position) is obtained using the synthesized face image. The technique for measuring the center itself is arbitrary.

The system structure described with reference to FIG. 1 and FIG. 2 is also an example and may be arbitrarily modified. For example, if an infra-red camera capable of taking images using near infra-red rays etc. is used as the camera 10, it is possible to acquire images for each part of the face in a comparatively accurate manner without being influenced by the race, the color of the skin, and hair.

If the same function is implemented for the flowchart above, then arbitrary change is possible.

For example, it is also possible to carry out process to cope with glasses when an image of a temple of the glasses is obtained more than a predetermined number of times.

Further, in the present invention, the white-black-white edge expresses a difference in grayscale but the colors are not limited to black and white, and any hue is possible. It can also be considered to determine the presence or absence of a temple of the glasses by considering the hue of each pixel for a color image.

In each of the above embodiments, the present invention is applied to the case of photographing a driver and detecting a temple of the glasses. However, the invention is not limited to that, and can also be broadly applied to processing for determining whether or not a person, animal, doll, or robot etc. wears glasses or accessories.

The present invention is not limited to processing while acquiring images using a camera, and may, for example, be used in order to determine the presence or absence of a temple of the glasses, the position of the center of a face, or the orientation of a face etc. for one or a number of face images taken elsewhere.

Further, it is also possible to store a computer program that executes the above processing on a computer in a ROM via an arbitrary recording medium or network.

In the above embodiment, the image memory 22 constitutes the face image storage means. Further, the ROM 23 and the CPU 24 constitute the contour determining means, wearing glasses determining means, facing sideways determining means, center position detecting means, vertical direction center position detecting means, and synthesizing means. Moreover, the image memory 22 or the ROM 23 constitutes the eye region image storing means.

The embodiments disclosed on this occasion are for all points cited as examples and should in no way be considered limiting. The scope of the present invention is as depicted not by the explanation above but by the scope of the patent claims and are intended to mean the equivalent to the scope of the patent claims and include all modifications within the scope.

This application is based on Japanese Patent Application No. 2005-305189 submitted on Oct. 20, 2005. The specification, scope of the patent claims, and all of the drawings of Japanese Patent Application 2005-305189 are herein incorporated by reference in this specification.

INDUSTRIAL APPLICABILITY

According to the present invention, it is possible to detect a center position of a face in a face image even, for example, when a driver of a vehicle is wearing glasses and is not facing to the front. Using the center position of the face in the face image, utilization is possible in, for example, calculation of the orientation of a face for identification of a driver, or reading of a facial expression.

The invention claimed is:

1. A face center position detecting device comprising:
   a face image storage unit that stores images obtained by photographing a face;
   a contour determining unit that processes the images stored in the face image storage unit and obtains positions of contours in a lateral direction of the face images;
   a wearing glasses determining unit that determines whether or not glasses are being worn on faces of the images stored in the face image storage unit;
   a sideways orientation determining unit that determines whether or not a face of the face images stored in the face image storage unit is facing sideways; and
   a center position detecting unit that detects a center position of the face based on images for a lower part of a face of the face images stored in the face image storage unit and for regions between contour positions obtained by the contour determining unit when the wearing glasses determining unit determines that glasses are being worn on the face of the face image and the sideways orientation determining unit determines that the face of the face image is facing sideways.

2. The face center position detecting device according to claim 1, wherein the wearing glasses determining unit determines whether or not an image of a temple of glasses is included in a face image, and when it is determined that an image of a temple of the glasses is included in the face image, determines that glasses are being worn on the face of the face image.

3. The face center position detecting device according to claim 1, the sideways orientation determining unit comprising:
   means for determining whether or not an image of a temple of the glasses is contained in the face image; and
   means for determining that the face is facing sideways when determined by the means that an image of a temple of glasses is contained in the face image.

4. The face center position detecting unit according to claim 1, wherein the center position detecting unit detects a center position in a lateral direction of the face based on an image of a region for a part of the face image below the glasses that is an image of a region positioned between positions of contours in the lateral direction.

5. The face center position detecting device according to claim 1, the center position detecting unit further comprising a vertical direction center position detecting means that detect a vertical center position of a face,
   wherein the vertical direction center position detecting means is comprising:
   eye region image storing means that store standard eye region images;
   synthesizing means that synthesize images of eye regions stored in the eye region image storing means at the eye regions of the face images; and
   means for detecting a center position of a face in a vertical direction based on images synthesized by the synthesizing means.

6. The face center position detecting device according to claim 1, wherein the center position detecting unit detects a provisional face center position based on a region for a lower part of a face, of the face images stored in the face image storage unit, and an image for a region between positions of contours obtained by the contour determining unit, sets face center searching regions based on the provisional face center position, and detects the center position of the face again from within the face center search region.

7. The face center position detecting device according to claim 6, wherein the center position detecting unit sets the face center search region centered on the provisional face center position in such a manner that a left edge position coordinate and a right edge position coordinate are bilaterally symmetrical.

8. A face center position detecting method comprising:
   a face image storing step of storing face images obtained by photographing a face;
   a contour determining step of processing face images stored in the face image storing step and obtaining contour positions in a lateral direction of the face;
   a wearing glasses determining step of determining whether or not glasses are worn on the faces of the face images stored in the face image storing step;
   a sideways orientation determining step of determining whether or not a face of a face image stored in the face image storing step is facing sideways; and
   a center position detecting step of detecting a center position of a face based on images for a lower part of a face of the face images stored in the face image storage unit and for regions between contour positions obtained by the contour determining unit when determined in the wearing glasses determining step that glasses are being worn on the face of the face image and the sideways orientation determining step determines that the face of the face image is facing sideways.

9. A non-transitory computer-readable medium storing program causing a computer to execute:
   a face image storing procedure that stores face images obtained by photographing a face;
   a contour determining step that processes face images stored in the face image storage step and obtains positions of contours in a lateral direction of the face;
   a wearing glasses determining procedure that determines whether or not glasses are being worn on faces of the face images stored in the face image storage step;
   a sideways orientation determining step that determines whether or not a face of the face image stored in the face image storage unit is facing sideways;
   a center position detecting step of detecting a center position of a face based on images for a lower part of a face of the face images stored in the face image storage unit and for regions between contour positions obtained by the contour determining unit when determined in the wearing glasses determining step that glasses are being worn on the face of the face image and the sideways orientation determining step determines that the face of the face image is facing sideways.

* * * * *